(12) United States Patent
Watanabe et al.

(10) Patent No.: US 8,033,701 B2
(45) Date of Patent: Oct. 11, 2011

(54) HEAD LAMP LEVELING DEVICE FOR VEHICLE

(75) Inventors: Takashi Watanabe, Isehara (JP); Yuuki Sugimoto, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 205 days.

(21) Appl. No.: 12/560,680

(22) Filed: Sep. 16, 2009

(65) Prior Publication Data
US 2010/0091512 A1    Apr. 15, 2010

(30) Foreign Application Priority Data

Sep. 17, 2008  (JP) .................... 2008-238244

(51) Int. Cl.
*F21V 33/00*    (2006.01)

(52) U.S. Cl. ........................ 362/528; 362/287

(58) Field of Classification Search ............ 362/524, 362/528, 285, 287
See application file for complete search history.

(56) References Cited

U.S. PATENT DOCUMENTS

| | | | |
|---|---|---|---|
| 4,574,334 A * | 3/1986 | Igura | 362/515 |
| 6,234,655 B1 * | 5/2001 | Suehiro et al. | 362/515 |
| 2006/0291231 A1 * | 12/2006 | Deguchi | 362/512 |

FOREIGN PATENT DOCUMENTS

| | | |
|---|---|---|
| DE | 195 21 270 A1 | 12/1995 |
| EP | 0 968 879 B1 | 1/2000 |
| FR | 2 689 071 A1 | 10/1993 |
| JP | 07-130206 A | 5/1995 |
| JP | 2835927 B2 | 10/1998 |

* cited by examiner

*Primary Examiner* — Laura Tso
(74) *Attorney, Agent, or Firm* — Foley & Lardner LLP

(57) ABSTRACT

A vehicle headlamp of the present invention is provided with a lamp housing and a leveling device. The lamp housing has: a mount portion in which a circular through hole is provided; and an abutment protrusive portion which is provided at the mount portion. The leveling device has: a housing for providing a cylinder portion which is inserted into the circular through hole, and is mounted at a rim of the circular through hole; and an abutment face protrusive portion which is provided partly of the housing and allows the abutment protrusive portion to be in abutment against. As a result, the vehicle headlamp of the present invention allows the abutment protrusive portion to be in abutment against the abutment face protrusive portion, making it possible to ensure a stable distance between the lamp housing and the leveling device.

10 Claims, 11 Drawing Sheets

HEAD LAMP LEVELING DEVICE FOR VEHICLE

CROSS REFERENCE TO RELATED APPLICATIONS

This application claims priority of Japanese Patent Application No. 2008-238244 filed on Sep. 17, 2008. The contents of this application are incorporated herein by reference in their entirety.

BACKGROUND OF THE INVENTION

1. Field of the Invention

The present invention relates to a vehicle headlamp such as a headlamp or a fog lamp, for example, having a leveling device for adjusting an optical axis.

2. Description of the Related Art

A vehicle headlamp having a leveling device, of this type, is conventionally known (Japanese Laid-open Patent No. 2835927, for example). Hereinafter, the conventional vehicle headlamp having the leveling device will be described. In the conventional vehicle headlamp having the leveling device, a holding cylinder portion of a casing body of the leveling device is inserted into an insert hole of a lamp body and the holding cylinder portion is mounted on a rim of the insert hole; and an adjusting screw, protruding from the holding cylinder portion of the leveling device, is mounted on a reflection mirror, allowing a fixing wall of the lamp body to be abutted against the casing body of the leveling device. Afterward, by driving a drive mechanism in the casing body of the leveling device, the adjusting screw is driven and the mirror is tilted with respect to the lamp body, and an optical axis of the vehicle headlamp is adjusted.

In the above-described conventional vehicle headlamp having the leveling device, the holding cylinder portion of the casing body of the leveling device is mounted on the rim of the insert hole of the lamp body; the leveling device is mounted on the lamp body; and further, the fixing wall of the lamp body is allowed to abut against the casing body of the leveling device, allowing the lamp body and the leveling device to be mounted in a stable manner without a backlash.

Incidentally, the above-described conventional vehicle headlamp having the leveling device allows the fixing wall of the lamp body to merely abut against the casing body of the leveling device, thus so that the entire thickness of the casing body against which the fixing wall abuts is substantially uniform. Thus, in the conventional vehicle headlamp having the leveling device, if a protrusive portion or a rib exists inside of the casing body, a surface sink occurs with an exterior face of the casing body corresponding to the protrusive portion or rib, and the exterior face of the casing body may be deformed. As a result, the conventional vehicle headlamp having the leveling device makes it difficult to ensure a stable distance between the casing body and the lamp body, thus entailing is a problem in stably mounting the lamp body and the leveling device without a backlash.

The present invention has been made to solve the above-described problem that the conventional vehicle headlamp having the leveling device entails difficulty in ensuring a stable distance between the casing body and the lamp body.

SUMMARY OF THE INVENTION

A first aspect of the present invention is directed to a vehicle headlamp having a leveling device for adjusting an optical axis, the vehicle headlamp comprising:

a fixing member;
a tilting member which is tiltably mounted on the fixing member; and
the leveling device, wherein:
the fixing member has:
a mount portion in which a through hole is provided; and
an abutment protrusive portion which is provided on the mount portion; and wherein:
the leveling device has:
a housing for providing a cylinder portion which is inserted into a through hole and is mounted at a rim of the through hole;
a drive unit which is disposed in the housing;
a shaft which is retractably mounted on the housing and cylinder portion, is mounted on the tilting member, is advanced/retracted with respect to the housing and the cylinder portion by driving the drive unit, for tilting the tilting member with respect to the fixing member to adjust an optical axis of the vehicle headlamp; and
an abutment face protrusive portion which is provided partly of the housing and allows the abutment protrusive portion to be in abutment against.

A second aspect of the present invention is directed to the vehicle headlamp according to the first aspect, wherein:
the abutment face protrusive portion has a predetermined width and height, and is provided along a rim of the housing.

A third aspect of the present invention is directed to the vehicle headlamp according to the first aspect, wherein:
the shaft is positioned on a vertical centerline of the housing, and the abutment face protrusive portion has a predetermined width and height, and is provided on the vertical centerline of the housing.

A fourth aspect of the present invention is directed to a vehicle headlamp, comprising:

(i) a lamp housing forming a lamp room together with a lamp lens and having an insert hole;

(ii) a mount bracket which is mounted on the lamp housing so as to be tiltable in the lamp room, for mounting a lamp unit for illuminating a predetermined light distribution pattern to a forward direction of a vehicle through the lamp lens; and (iii) a leveling device including:
  a cylinder portion which is mounted at a rim of the insert hole of the lamp housing; and
  a shaft which is retractably mounted on the cylinder portion and is inserted into the insert hole of the lamp housing, for tilting the mount bracket to adjust an optical axis of the lamp unit, wherein:

the vehicle headlamp includes an abutment portion which is downward of a face having the shaft and the cylinder portion, of the leveling device, provided thereon, and is disposed between the leveling device and an exterior wall of the lamp housing, and which is formed so that the leveling device and the exterior wall of the lamp housing are in abutment against each other while maintaining a predetermined distance.

A fifth aspect of the present invention is directed to the vehicle headlamp according to the fourth aspect, wherein:
the abutment portion has an abutment face protrusive portion which is formed downward of a face having the shaft and the cylinder portion, of the leveling device, provided thereon, the abutment face protrusive portion having a predetermined thickness toward the exterior wall of the lamp housing.

A sixth aspect of the present invention is directed to the vehicle headlamp according to the fourth aspect, wherein:
the abutment portion has: an abutment face protrusive portion which is formed downward of a face having the shaft and the cylinder portion, of the leveling device, provided thereon, the abutment face protrusive portion having a predetermined thickness toward the exterior wall of the lamp housing; and an abutment protrusive portion which is formed on the exterior wall of the lamp housing, for abutting against the abutment face protrusive portion of the leveling device.

A seventh aspect of the present invention is directed to the vehicle headlamp according to the fourth aspect, wherein:

the abutment portion has an abutment protrusive portion which is formed on the exterior wall of the lamp housing, for abutting against the leveling device.

An eighth aspect of the present invention is directed to the vehicle headlamp according to the fourth aspect, wherein:

the abutment portion has an abutment face protrusive portion which is formed downward of the face having the shaft and the cylinder portion, of the leveling device, provided thereon, so as to preclude a downward deformation of the face having the shaft and the cylinder portion, of the leveling device, provided thereon, the abutment face protrusive portion having a predetermined thickness toward the exterior wall of the lamp housing.

A ninth aspect of the present invention is directed to a vehicle headlamp, comprising:

(i) a lamp housing forming a lamp room together with a lamp lens and having an insert hole;

(ii) a mount bracket which is mounted on the lamp housing so as to be tiltable in the lamp room, for mounting a lamp unit for illuminating a predetermined light distribution pattern to a forward direction of a vehicle through the lamp lens; and (iii) a leveling device including:

a cylinder portion which is mounted at a rim of the insert hole of the lamp housing; and a shaft which is retractably mounted on the cylinder portion and is inserted into the insert hole of the lamp housing, for tilting the mount bracket to adjust an optical axis of the lamp unit, wherein:

the leveling device includes an abutment face protrusive portion which is formed downward of a face having the shaft and the cylinder portion, of the leveling device, provided thereon, the abutment face protrusive portion having a predetermined thickness toward an exterior wall of the lamp housing so that the leveling device and the exterior wall of the lamp housing are in abutment against each other while maintaining a predetermined distance.

A tenth aspect of the present invention is directed to the vehicle headlamp according to the ninth aspect, wherein:

the lamp housing includes an abutment protrusive portion which is formed at a position opposite to the abutment face protrusive portion of the leveling device on the exterior wall of the lamp housing, for abutting against the leveling device.

According to the first aspect of the present invention, a cylinder portion of a housing of a leveling device is mounted at a rim of a through hole of a mount portion of a fixing member; the leveling device is mounted on the mount portion of the fixing member; and further, an abutment protrusive portion of the mount portion of the fixing member is allowed to abut against an abutment face protrusive portion of the housing of the leveling device, allowing the fixing member and the leveling device to be mounted in a stable manner without a backlash. A vehicle headlamp having the leveling device, of the present invention, is provided in such a manner that: an abutment face protrusive portion is provided partly of the housing, thus allowing the thickness of the housing to be increased at a site of the abutment face protrusive portion and to be decreased at other sites. Therefore, the vehicle headlamp having the leveling device, according to the first aspect of the present invention, becomes capable of precluding a surface sink from occurring with an exterior face of the housing corresponding to the protrusive portion or rib, making it possible to preclude deformation of the exterior face of the housing, even with a case of having a protrusive portion or rib inside the housing. As a result, the vehicle headlamp having the leveling device, of the present invention, becomes capable of ensuring a stable distance between the mount portion of the fixing member and the housing of the leveling device, thus allowing the fixing member and the leveling device to be mounted in a stable manner without a backlash.

According to the second aspect of the present invention, an abutment face protrusive portion has a predetermined width and height, and is provided along a rim (outer circumference) of a housing, so that strength of the rim of the housing is improved, making it possible to preclude the housing from warping due to a change of an ambient temperature and to maintain performance of a leveling device, as the result of the improvement. For example, as shown in FIGS. 4 and 5, there may be a case in which: a housing is divided into sections, a first portion (the foreside housing) 9 at which the cylinder portion 15 and the abutment face protrusive portions 19, 190, 191 are provided and the other one, a second portion (the backside housing) 10; the first portion 9 and the second portion 10 are integrally fixed to each other by means of engagement between the rim of the engagement hole 23 and the engagement claw 26 in a state in which the first portion 9 is engaged with the second portion 10 from the outside; and a sealing member 29 such as packing is interposed between the first portion 9 and the second portion 10. In this case, the strength of the rim of the first portion 9 of the housing is improved by means of the abutment face protrusive portions 19, 190 that are provided along the rim of the first portion 9 of the housing, so that the first portion 9 of the housing warps due to a change of an ambient temperature, making it possible to preclude a side wall of the first portion 9 from opening in the direction indicated by the arrow drawn by the solid line, of FIG. 5. In this manner, a state of engagement between the rim of the engagement hole 23 and the engagement claw 26 is stabilized, making it possible to preclude the engagement claw 26 being disengaged from the rim of the engagement hole 23. In addition, a crush quantity of the sealing member 29 between the first portion 9 and the second portion 10 is stabilized, making it possible to preclude entry of water or dust into the housing. As a result, performance of the leveling device 6 can be maintained in response to a change of an ambient temperature.

In addition, according to the second aspect of the present invention, an abutment face protrusive portion has a predetermined width, and is provided along a rim (outer circumference) of the housing, so that an abutment protrusive portion abutting against the abutment face protrusive portion can be provided in a range corresponding to the abutment face protrusive portion, i.e., at any position (site) in a wide range along the rim of the housing, of the mount portion of the fixing member. As a result, the vehicle headlamp having the leveling device, of the present invention, is provided in such a manner that the shape or layout of the mount portion of the fixing member are different depending upon vehicle types, and even in a case where an abutment protrusive portion is provided at a different position of the mount portion of the fixing member, an abutment face protrusive portion which has a predetermined width and is provided along the rim (outer circumference) of the housing can suffice. In this manner, the vehicle headlamp having the leveling device, according to the second aspect of the present invention, allows the shared leveling device of one type to be compatible with a respective one of the fixing members of various vehicle types, so that manufacture or product management of the leveling device is simplified and cost reduction can be achieved accordingly.

According to the third aspect of the present invention, a shaft is positioned on a vertical centerline of a housing; and an abutment face protrusive portion has a predetermined width and height, and is provided on the vertical centerline of the housing, so that: a center of a mount site between a rim of a through hole of the mount portion of the fixing member and a cylinder portion of the housing of the leveling device; and an abutment site between the abutment protrusive portion of the mount portion of the fixing member and the abutment face protrusive portion of the housing of the leveling device are positioned on the vertical centerline of the housing. Therefore, the vehicle headlamp having the leveling device, of the present invention, i.e., the headlamp 1, allows the leveling device to be fixed to the fixing member in a well-balanced manner on the left and right with respect to the vertical centerline of the housings, so that the fixing member and the leveling device can be mounted in a stable manner without a backlash.

In addition, according to the third aspect of the present invention, an abutment face protrusive portion has a predetermined width, and is provided on a vertical centerline of a housing, so that an abutment protrusive portion abutting against the abutment face protrusive portion can be provided in a range corresponding to the abutment face protrusive portion, i.e., at any position (site) in a wide range on the vertical centerline of the housing, of the mount portion of the fixing member. As a result, the vehicle headlamp having the leveling device, of the present invention, is provided in such a manner that the shape or layout of the mount portion of the fixing member are different depending upon vehicle types, and even in a case where an abutment protrusive portion is provided at a different position of the mount portion of the fixing member, an abutment face protrusive portion which has a predetermined width and is provided on the vertical centerline of the housing can suffice. In this manner, the vehicle headlamp having the leveling device, according to the second aspect of the present invention, allows the shared leveling device of one type to be compatible with the fixing member of various vehicle types, so that manufacture or product management of the leveling device is simplified and cost reduction can be achieved accordingly.

DESCRIPTION OF THE PREFERRED EMBODIMENTS

Figure 1:
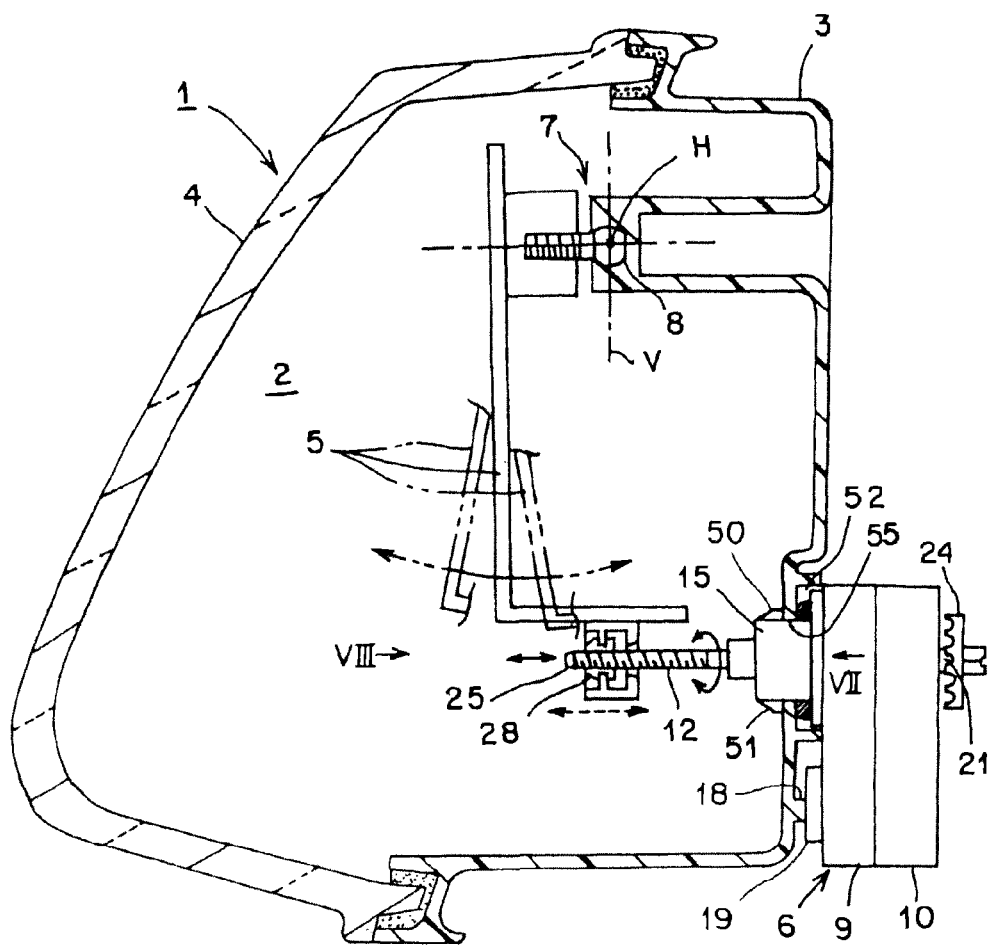
FIG. 1 is a longitudinal cross section (vertical cross section) of a headlamp showing an embodiment of a vehicle headlamp having a leveling device, according to the present invention.

Hereinafter, the embodiments of a vehicle headlamp having a leveling device, according to the present invention, will be described in detail referring to the drawings. The present invention is not limited by these embodiments.

First, a constitution of the vehicle headlamp having the leveling device, of the embodiment, will be described. In FIG. 1, reference numeral 1 designates the vehicle headlamp having the leveling device of the embodiment, and a headlamp is shown in this example. The headlamp 1 is provided with: a lamp housing 3 and a lamp lens 4 serving as fixing members for partitioning a lamp room 2; a mount bracket 5 serving as a tilting member which is disposed in a lamp room 2; and a leveling device 6 which is disposed between the lamp housing 3 and the mount bracket 5.

The tilting member is made up of: one or multiple lamp units (not shown); and the mount bracket 5 having such one or multiple lamp units mounted thereon. The lamp unit is of various types, such as a projector type, a reflector type (reflection type) and a direct emission type. The lamp unit illuminates light (not shown) from a light source (not shown), as a predetermined light distribution pattern (not shown), to a forward direction of a vehicle through the lamp lens 4 along a predetermined optical axis (not shown). Constituent elements of the lamp unit, for example, a reflector and the mount bracket 5 may serve both as their functions. In addition, light sources include a semiconductor-type light source such as an LED, a discharge lamp such as an HID, a halogen bulb, an incandescent bulb and the like, for example. Further, predetermined light distribution patterns include a light distribution pattern for passing, a light distribution pattern for expressway, and a light distribution pattern for cruising, for example.

The mount bracket 5 of the tilting member is vertically rotatably mounted on the lamp housing 3 via the leveling device 6 and a pivot mechanism 7 around a horizontal line H (including a substantially horizontal line) passing through a center of a ball portion 8 of the pivot mechanism 7. An optical axis adjustment mechanism for leftward and rightward adjustment (not shown) is provided between the lamp housing 3 and the mount bracket 5, whereby the tilting member may be constituted in a transversely optical-axis adjustable manner, around a vertical line V (including a substantially vertical line) passing through the center of the ball portion 8 of the pivot mechanism 7.

Figure 2:
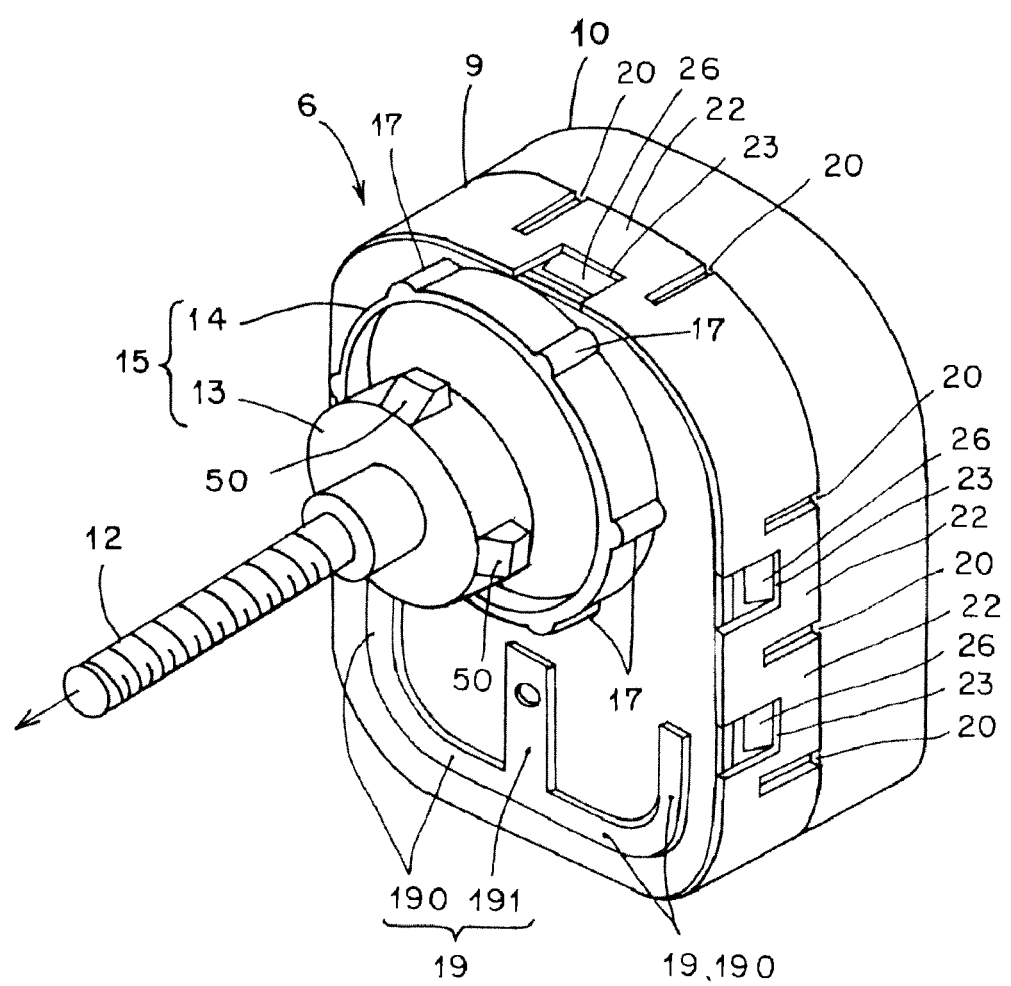
FIG. 2 is a perspective view showing the leveling device.
Figure 3:
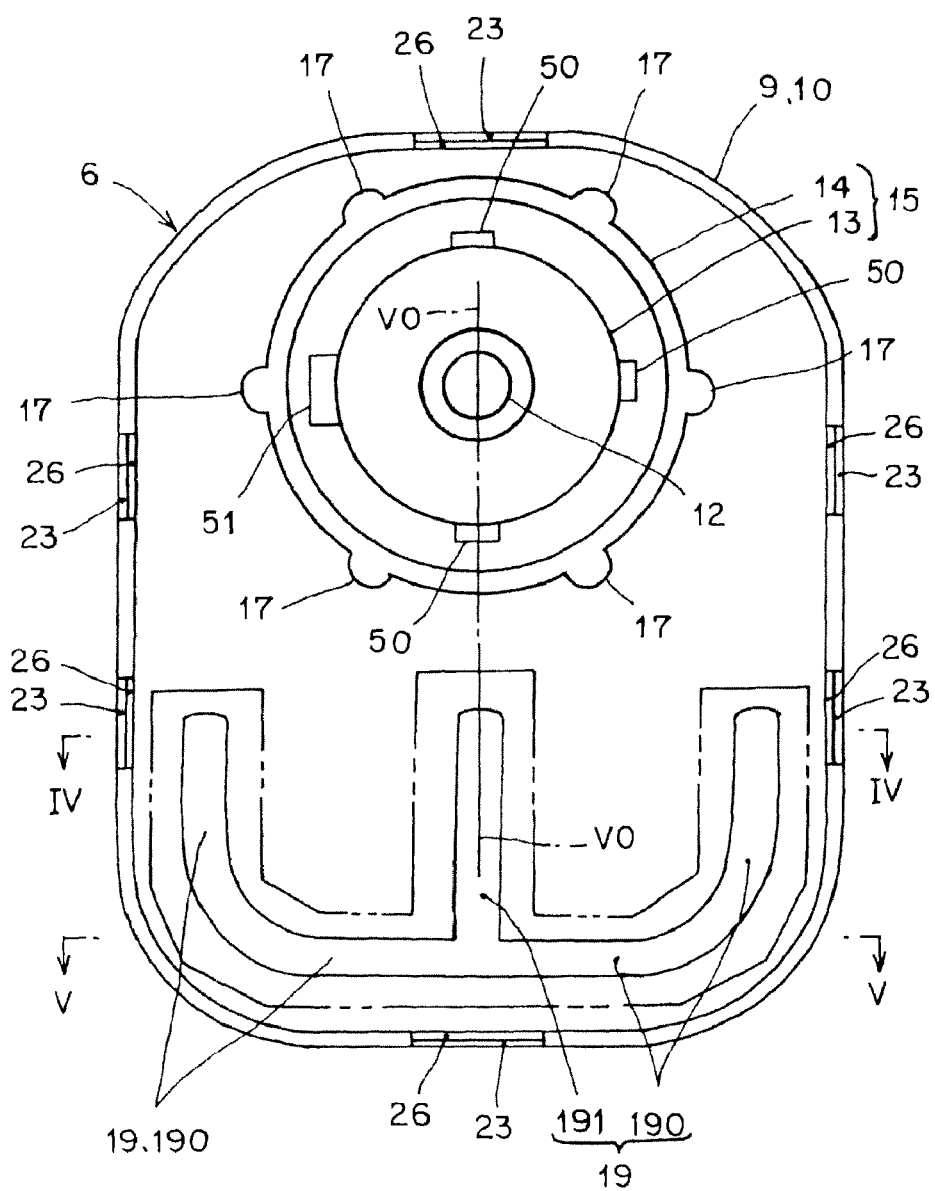
FIG. 3 is a front view showing the leveling device.

The leveling device 6, as shown in FIGS. 1 and 2, is provided with: housings 9, 10; a motor (not shown), which serves as a drive unit, and a drive force transmission mechanism (not shown); a shaft 12; a connector portion (not shown); and a printed wiring board (not shown) serving as a board.

The housings 9, 10 are mounted on the lamp housing 3 via an O-ring shaped packing 52 with air tightness or water tightness by means of engagement claws 50, 51. The housing, as shown in FIGS. 1 to 5, is vertically (substantially vertically) divided into two sections, i.e., a foreside housing 9 serving as a first portion and a backside housing 10 serving as a second portion. The foreside housing 9 and the backside housing 10 are removably integrated or fixed by means of engagement between a rim of an engagement hole 23 and an engagement claw 26, in a state in which the foreside housing 9 is engaged with the backside housing 10 from the outside.

In other words, a groove 20 is provided at a rim of an opening of the foreside housing 9. An elastic piece 22 is provided between the grooves 20. The engagement hole 23 is provided in the elastic piece 22. A total of the six engagement holes 23 are provided, one of which are provided at a respective one of the centers of the top and bottom rims of the foreside housing 9 and two of which are provided at respective ones of the centers of the left and right rims. On the other hand, the six engagement claws 26, each of which is shaped like a lance, are provided for the six engagement holes 23 at rims of an opening of the backside housing 10. The six engagement holes 23 and the six engagement claws 26 engage with each other, respectively.

A sealing member 29, such as packing, is interposed between the foreside housing 9 and the backside housing 10. The sealing member 29 is formed in an annular shape, for holding between the foreside housing 9 and the backside housing 10 with air tightness or water tightness.

An abutment face protrusive portion 19 is integrally provided partly of the foreside housing 9. In other words, the abutment face protrusive portions 19, 190 are shaped like a flat face; have a predetermined width W and height T; and are formed in a recessed shape and are integrally provided along a surface lower edge and a lower part of the left and right rims, respectively, of the foreside housing 9. In addition, the abutment face protrusive portions 19, 191 have a predetermined width W and height T, and are integrally provided at a site of a lower half of the foreside housing 9 and on the vertical centerline VO-VO of the housings 9, 10, respectively. As a result, the abutment face protrusive portions 19, 190, 191 have a predetermined width W and height T, and are integrally provided in an E-shape on the surface of the foreside housing 9, respectively.

A protrusive portion and a rib 27 for holding the motor; the drive force transmission mechanism; the shaft 12; the connector portion; and the printed wiring board as the board or the like, are integrally provided at the backside of the foreside housing 9 (inside of the housings 9, 10).

A cylinder portion, namely a cylinder portion 15 in the embodiment, is integrally provided at a substantial upside center of the front side (exterior face side) of the foreside housing 9. At a substantial upside center of the backside (exterior face) of the rear housing 10, a small cylinder portion 21 is integrally provided coaxially to the cylinder portion 15 of the foreside housing 9. In addition, a recessed portion (not shown) for inserting a connector (not shown) on the vehicle side is provided at a substantial center of the downside of the backside (exterior face) of the backside housing 10.

The cylinder portion 15 is made of a small-diameter cylinder portion 13 and a large-diameter cylinder portion 14 via a stepped portion 11. In other words, the cylinder portion 15 is made of: double cylinder portions, i.e., an inside cylinder portion 13 which is small in diameter and long in an axial direction; and an outside cylinder portion 14 which is large in diameter and short in an axial direction. The small-diameter cylinder portion 13 and the large-diameter cylinder portion 14 are concentric with each other.

Of the cylinder portion 15, the four engagement claws 50, 51 are integrally provided, respectively, in a crossing direction on an outer circumferential face of the small-diameter cylinder portion 13. Of the four engagement claws, three engagement claws 50 are narrow, and one engagement claw 51 that remains is wide. In addition, an annular accommodation recessed portion 16, in which the packing 52 is to be accommodated, is provided in the stepped portion 11 of the cylinder portion 15.

On the outer circumferential face of the large-diameter cylinder portion 14 of the cylinder portion 15, six engagingly lock protrusive portions (engagingly lock protrusive stripes) 17 are integrally provided, respectively, in the axial direction of the cylinder portion 15 with equal intervals.

Of the lamp housing 3 of the headlamp 1, a through hole for mounting the leveling device 6, a circular through hole 55 in the embodiment is provided at a mount portion 53 which serves as a site for mounting the leveling device 6. The circular through hole 55 of the mount portion 53 is made of an inside small-diameter circular through hole 56 and an outside large-diameter through hole 57 via a stepped portion 54. The large-diameter circular through hole 57 is made of an inside space of a short cylinder wall part which is integrally provided on an exterior face of the lamp housing 3, outside of the small-diameter circular through hole 56. In addition, an abutment protrusive portion 18, such as a pin or a rib, which is in abutment against a flat face of the abutment face protrusive portions 19, 190, 191, is integrally provided at the mount portion 53. An abutment between the flat face of the abutment face protrusive portions 19, 190, 191 and a tip end of the abutment protrusive portion 18 may be a point abutment or a face abutment.

An interior diameter of the small-diameter circular through hole 56 is slightly larger than an exterior diameter of the small-diameter cylinder portion 13. In addition, an interior diameter of the large-diameter circular through hole 57 is slightly larger than an exterior diameter of the large-diameter cylinder portion 14.

Of the circular through hole 55 of the mount portion 53, at rims of the small-diameter circular through hole 56, four groove portions 58, 59 are provided for the engagement claws 50, 51 in a crossing direction, respectively. Of the four groove portions, three groove portions 58 are narrow for the narrow engagement claws 50 and one groove portion 59 is wide for the wide engagement claw 51. The three narrow engagement claws 50 and groove portions 58 and such one wide engagement claw 51 and groove portion 59 are intended to preclude incorrect assembling when the leveling device 6 is mounted on the head lamp 1.

A stopper 60 is integrally provided at a rim of the small-diameter through hole 56 of the circular through hole 55 inside of the mount portion 53. In addition, on the inner circumferential face of the large-diameter circular through hole 57 of the circular through hole 55 of the mount portion 53, three lock protrusive portions (lock protrusive stripes) 61 are integrally provided, respectively, in the axial direction of the circular through hole 55 with equal intervals.

The shaft 12 is an adjusting screw, which is retractably and rotatably mounted in the forward/backward direction with respect to the housings 9, 10 and cylinder portion 15, namely in the axial direction of the shaft 12, via the drive force transmission mechanism and a crown gear 24, in the cylinder portion 15 of the foreside housing 9 and the small cylinder portion 21 of the backside housing 10. A screw portion 25 is provided at one end (front end) of the shaft 12.

At the screw portion 25 of the shaft 12, a nut member (nut or screw mounting) 28 is screw-tightened so that it can be screw-fed in the axial direction of the shaft 12 (in the direction indicated by the arrow drawn by the solid line, of FIG. 1, and the forward/backward direction). The nut member 28 is attached to the mount bracket 5. In this manner, the shaft 12 is mounted on the mount bracket 5 of the tilting member via the nut member 28. In addition, in such a manner as described previously, the housings 9, 10 are mounted on the lamp housing 3. As a result, the leveling device 6 is disposed between the lamp housing 3 as the fixing member and the mount bracket 5 as the tilting member.

If the shaft 12 is advanced/retracted by driving the motor in the direction indicated by the arrow drawn by the solid line, of FIG. 1, (in the axial direction of the shaft 12) with respect to the housings 9, 10 and the cylinder portion 15, the nut member 28 is advanced and retracted integrally with the advancement/retraction of the shaft 12 in the direction indicated by the dashed-line arrow of FIG. 1. In addition, as the shaft 12 is allowed to rotate by means of manual rotation of the crown gear 24 in the direction indicated by the arrow drawn by the solid line, of FIG. 1, with respect to the housings 9, and the cylinder portion 15, the nut member 28 is advanced and retracted with respect to the shaft 12 by means of a screw feeding action in the direction indicated by the dashed line of FIG. 1. In this manner, the tilting member such as the mount bracket 5 tilts vertically in the direction indicated by the arrow drawn by the double-dotted chain line of FIG. 1, and an optical axis of the headlamp 1 is thereby adjusted.

The drive force transmission mechanism is made up of a first gear, a second gear, a worm of a third gear, a worm wheel, and a rod, for example. The drive force transmission mechanism is disposed between the motor and the shaft 12 in the housings 9, 10, and the shaft 12 is advanced/retracted by driving the motor in the direction indicated by the arrow drawn by the solid line, of FIG. 1, (in the axial direction of the shaft 12) with respect to the housings 9, 10 and the cylinder portion 15.

A chamfer portion (not shown) of the shaft 12 is inserted into a chamber groove (not shown) of the crown gear 24. As a result, the shaft 12 is disallowed to be rotatable with respect to the crown gear 24, and is movable (retractable) in the axial direction. In this manner, the shaft 12 is allowed to rotate together with the crown gear 24 with respect to the housings 9, 10 and the cylinder portion 15, by means of manual rotation of the crown gear 24.

The shaft 12 is mounted to be retractable and rotatable in the axial direction with respect to the housings 9, 10 and the cylinder portion 15, via the drive force transmission mechanism and the crown gear 24. As a result, the shaft 12 is advanced/retracted by driving the motor in the direction indicated by the arrow drawn by the solid line, of FIG. 1, (in the axial direction of the shaft 12) with respect to the housings 9, 10 and the cylinder portion 15; and is allowed to rotate together with the crown gear 24 with respect to the housings 9, 10 and the cylinder portion 15, by means of manual rotation of the crown gear 24.

The printed wiring board is disposed in the housings 9, 10, and is mounted in the housings 9, 10. On the other face of the printed wiring board, although not shown, electronic components such as capacitors or hybrid ICs are packaged, and wiring is printed. A position sensor (not shown) is provided between the printed wiring board mounted on the housings 9, 10 and a second rod of the drive force transmission mechanism. The position sensor is made of a slide resistance, and is capable of measuring and keeping track of a tilting angle in the vertical direction of the optical axis of the headlamp 1. The position sensor and the motor 11 are connected to a control device (not shown) of an auto leveling system, whereby the optical axis in the vertical direction of the headlamp 1 can be automatically adjusted in accordance with a change in vehicle posture.

The connector portion is electrically connected to the printed wiring board and is electrically connected to a connector at the vehicle side, whereby power is fed to the motor via the printed wiring board.

A vehicle headlamp having a leveling device 6, of the embodiment, i.e., a headlamp 1 is made of the abovementioned constituent elements. Hereinafter, a method of mounting the leveling device 6 on a lamp housing 3 which serves as a fixing member will be described.

Figure 6:
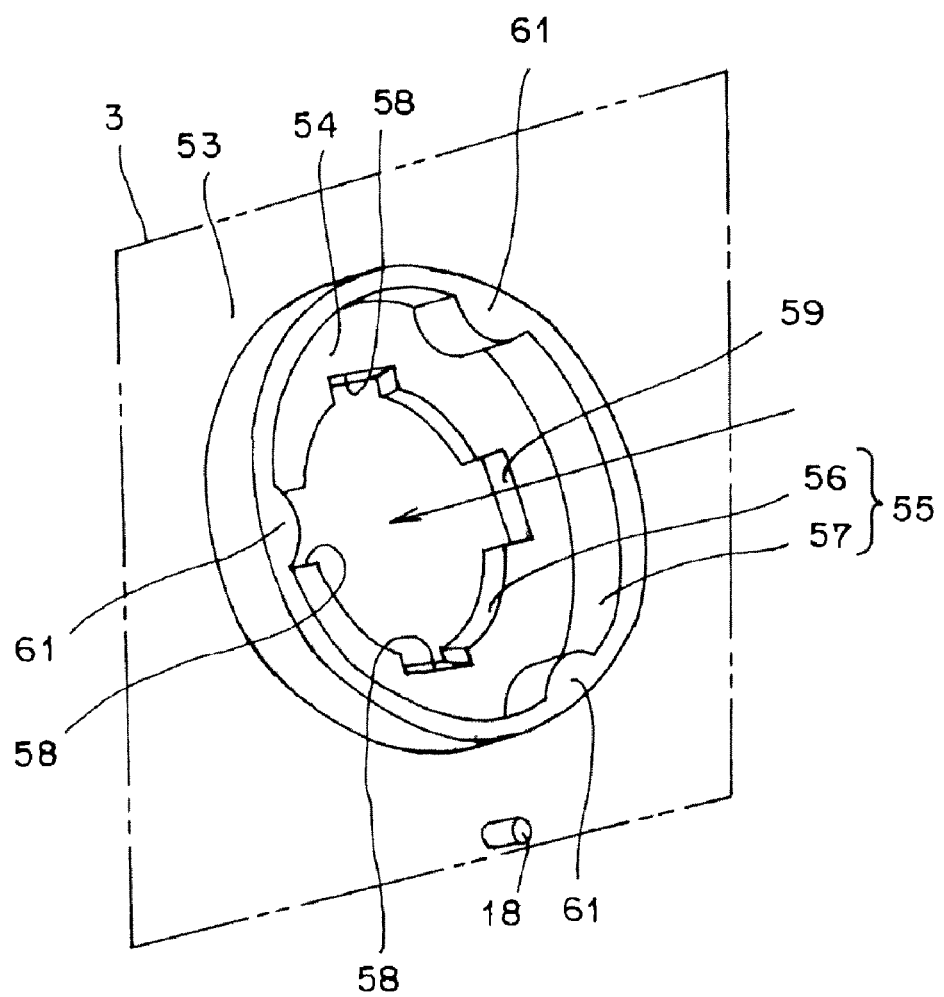
FIG. 6 is a partially perspective view showing a mount portion of a lamp housing.

First, packing 52 is set in an accommodation recessed portion 16 of a cylinder portion 15 in a foreside housing 9 of the leveling device 6, and is temporarily held thereon. Next, as indicated by the arrows drawn by the solid lines, of FIGS. 2 and 6, a shaft 12 of the leveling device 6 is inserted into a lamp room 2 from the outside via a circular through hole 55 (a small-diameter circular through hole 56 and a large-diameter circular through hole 57) of the lamp housing 3. Afterwards, three narrow engagement claws 50 and one wide engagement claw 51, of a cylinder portion 15 (a small-diameter cylinder portion 13) of the leveling device 6 are engaged with three narrow groove portions and one wide groove portion, of the circular through hole 55 (the small-diameter through hole 56) of a mount portion 53 of the lamp housing 3 (see FIGS. 7 and 8).

In the aforementioned state, the small-diameter cylinder portion 13 of the cylinder portion 15 of the leveling device 6 is inserted into the small-diameter through hole 56 and the lamp room 2 of the circular through hole 55 of the mount portion 53 of the lamp housing 3. In addition, the engagement claws 50, 51 of the cylinder portion 15 of the leveling device 6 are inserted into the lamp room 2 via the small-diameter circular through hole 56 of the circular hole 55 of the mount portion 53 of the lamp housing 3. Further, a large-diameter cylinder portion 14 of the cylinder portion 15 of the leveling device 6 is inserted into a large-diameter circular through hole 57 of the circular through hole 55 of the mount portion 53 of the lamp housing 3. At this time, the packing 52 is sandwiched in a state in which it is compressed between a stepped portion 11 of the cylinder portion 15 of the foreside housing 9 of the leveling device 6 (a bottom wall face of the accommodation recessed portion 16) and a stepped portion 54 of the circular through hole 55 of the mount portion 53 of the lamp housing 3.

Figure 7:
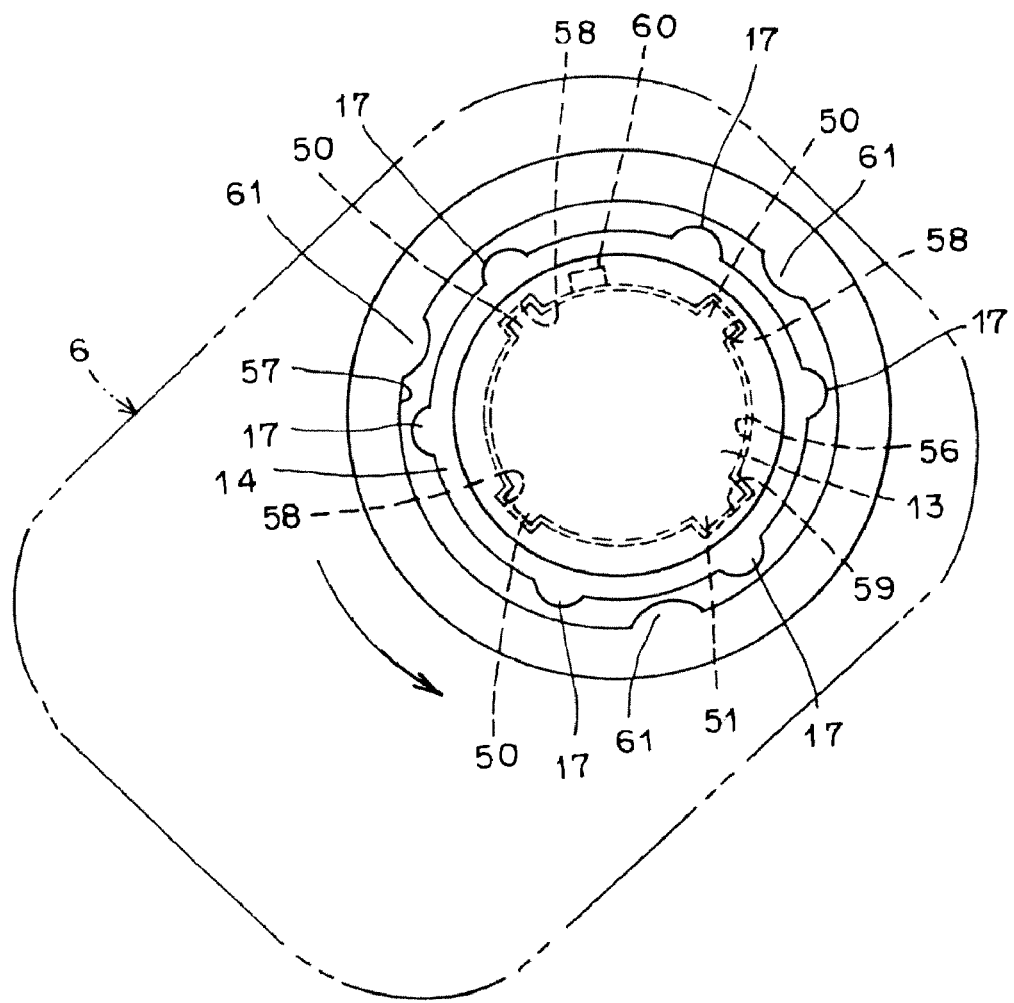
FIG. 7 is a view seen in the direction of the arrow VII of FIG. 1, showing a state before the leveling device is mounted on the lamp housing.
Figure 8:
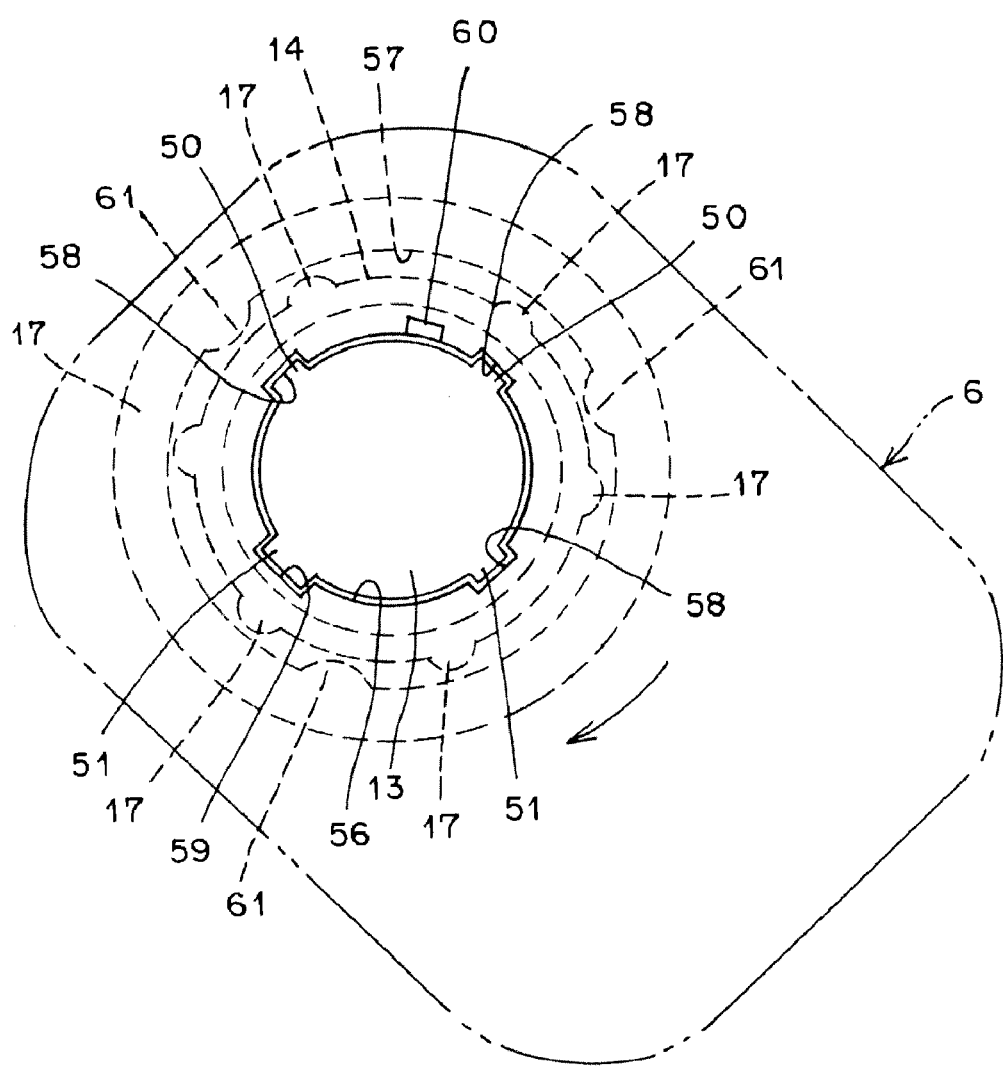
FIG. 8 is a view seen in the direction of the arrow VIII of FIG. 1, showing a state before the leveling device is mounted on the lamp housing.
Figure 9:
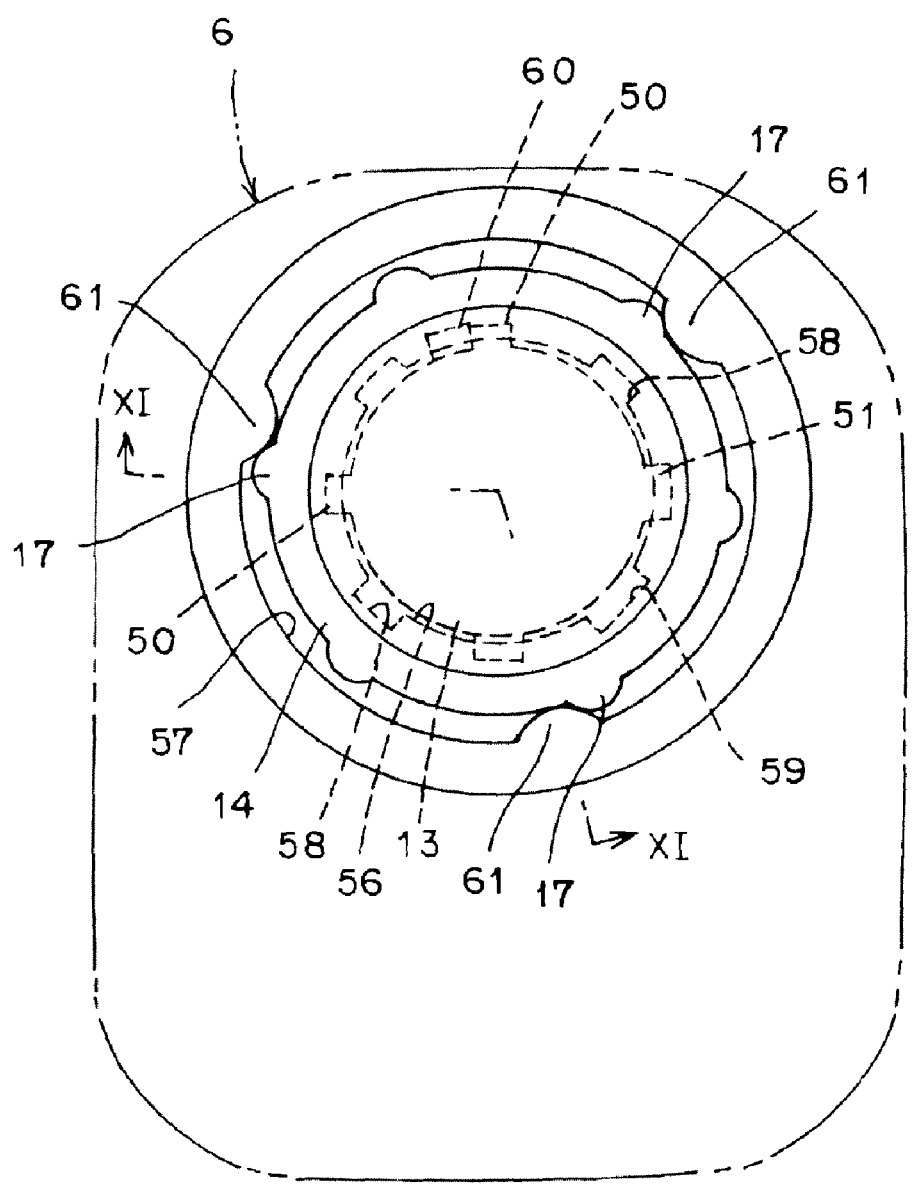
FIG. 9 is a view seen in the direction of the arrow VII of FIG. 1, showing a state after the leveling device has been mounted on the lamp housing.
Figure 10:
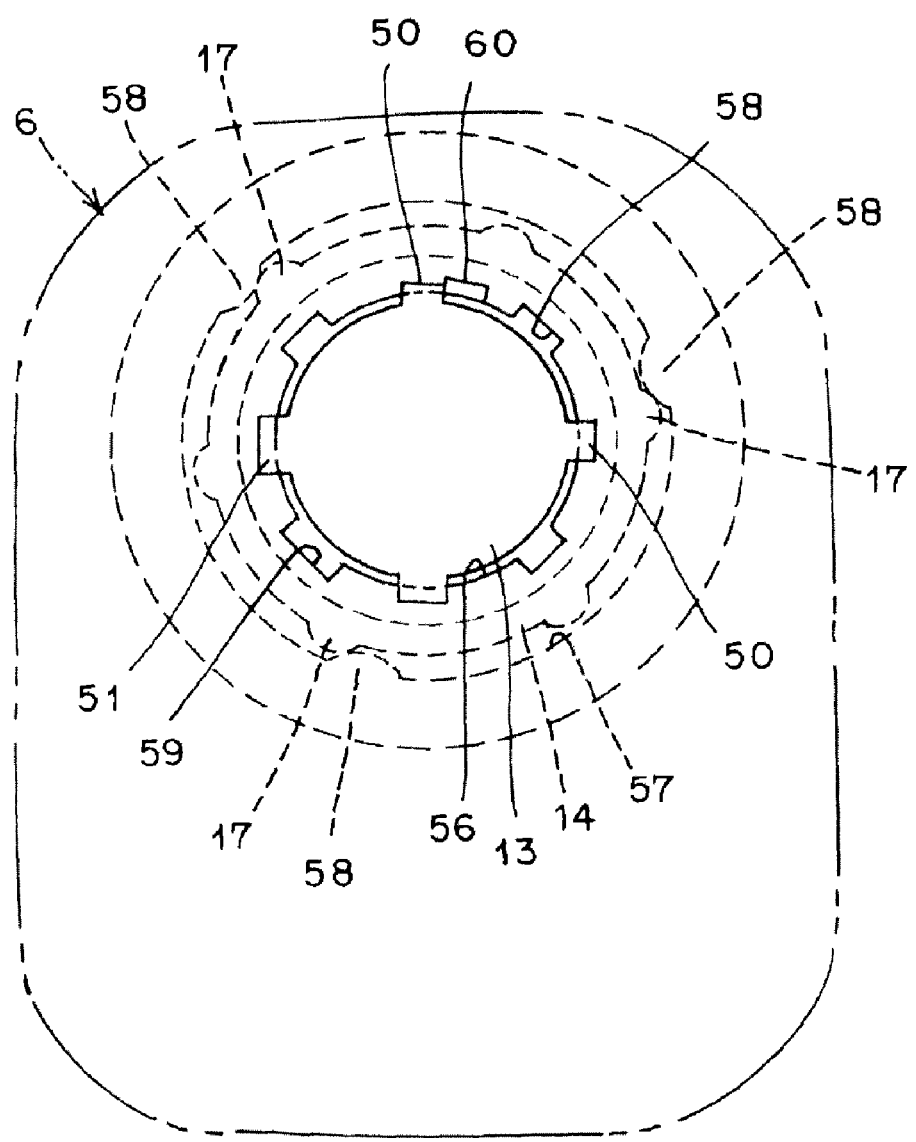
FIG. 10 is a view seen in the direction of the arrow VII of FIG. 1, showing a state after the leveling device has been mounted on the lamp housing.
Figure 11:
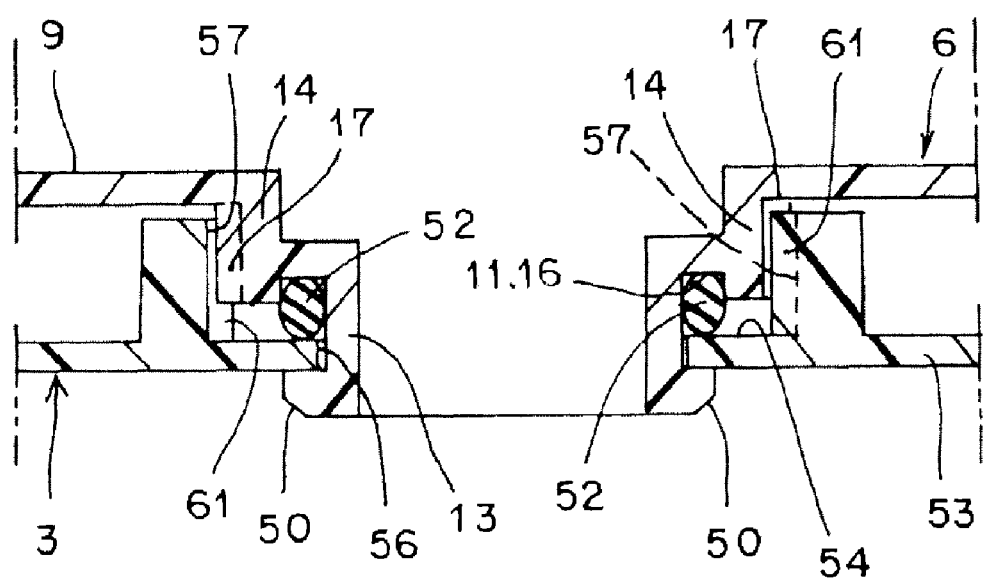
FIG. 11 is a cross section taken along the line XI-XI of FIG. 9.

Next, as indicated by the arrows drawn by the solid lines, of FIGS. 7 and 8, the leveling device 6 is allowed to rotate with respect to the lamp housing 3. The engagement claws 50, 51 of the cylinder portion 15 (the small-diameter cylinder portion 13) of the leveling device 6 then engage with rims of the circular through hole 55 (the small-diameter through hole 56) of the mount portion 53 of the lamp housing 3. In this manner, the leveling device 6 is mounted without moving in the axial direction of a shaft 12 (the axial direction of the cylinder portion 15 or the axial direction of the circular through hole 55) with respect to the lamp housing 3.

In addition, one engagement claw of the cylinder portion 15 (the small-diameter cylinder portion 13) of the leveling device 6 is in abutment against a stopper 60 at a rim of the circular through hole 55 (the small-diameter circular through hole 56) of the mount portion 53 of the lamp housing 3. In this manner, the leveling device 6 is around the axis of the shaft 12 (around the axis of the cylinder portion 15 or around the axis of the circular through hole 55) with respect to the lamp housing 3, and is mounted without rotating in the direction indicated by the arrows drawn by the solid lines, of FIGS. 2 and 6.

Further, when one engagement claw is in abutment against the stopper 60, three of the six engagingly lock recessed portions 17 of the cylinder portion 15 (the large-diameter cylinder portion 14) of the leveling device 6 are engagingly locked climbing over three lock protrusive portions 61, respectively, of the circular through hole 55 (the large-diameter through hole 57) of the mount portion 53 of the lamp housing 3. In this manner, the leveling device 6 is around the axis of the shaft 12 (around the axis of the cylinder portion 15 or around the axis of the circular through hole 55) with respect to the lamp housing 3, and is mounted without rotating in a reverse direction to that indicated by the arrows drawn by the solid lines, of FIGS. 2 and 6. When the three engagingly lock protrusive portions 17 of the cylinder portion 15 of the leveling device 6 climb over the lock protrusive portions 61 of the circular through hole 55 of the mount portion 53 of the lamp housing 3, a crisp sound and a crisp feel are obtained. By means of these crisp sound and crisp feel, it is possible to check that the leveling device 6 has been mounted to the lamp housing 3 by sound and touch.

In such a manner as described above, the housings 9, 10 and the cylinder portion 15 of the leveling device 6 are mounted on the mount portion 53 of the lamp housing 3. At this time, the packing 52 is interposed while it is compressed between the stepped portion 11 of the cylinder portion 15 of the leveling device 6 and the stepped portion 54 of the mount portion 53 of the lamp housing 3. In this manner, air tightness or water tightness is maintained in the lamp room 2 of the headlamp 1. In addition, three of the six engagingly lock protrusive portions 17 of the cylinder portion 15 (the large-diameter cylinder portion 14) of the leveling device 6 are engagingly locked climbing over three lock protrusive portions 61, respectively, of the circular through hole 55 (the large-diameter through hole 57) of the mount portion 53 of the lamp housing 3 of the headlamp 1. Thus, the leveling device 6 is supported by the lamp housing 3 by means of three-point support with equal intervals on a circumference, so that the leveling device 6 can be mounted on the lamp housing 3 with high precision while a center of the shaft 12 and the cylinder portion 15 of the leveling device 6 matches that of the circular through hole 55 of the lamp housing 3.

At this time, as shown in FIG. 1, an abutment protrusive portion 18 of the mount portion 53 of the lamp housing 3 of the headlamp 1 is in abutment against abutment face protrusive portions 19, 190, 191 of the foreside housing 9 of the leveling device 6.

The vehicle headlamp having the leveling device 6, of the embodiment, i.e., the headlamp 1 is made of the abovementioned constituent elements, and hereinafter, functions thereof will be described.

First, initial setting of an optical axis in the vertical direction of the headlamp 1 will be described. A crown gear 24 is manually rotated by means of a tool. Afterward, by means of the action of a drive force transmission mechanism, the shaft 12 is merely rotated without advancing/retracting (moving) in the axial direction with respect to the housings 9, 10 and the cylinder portion 15.

When the shaft 12 is allowed to rotate by means of manual rotation of the crown gear 24 in the direction indicated by the arrow drawn by the solid line, of FIG. 1, with respect to the housings 9, 10 and the cylinder portion 15, a nut member 28 screwed into a screw portion 25 of the shaft 12 is advanced/retracted in the axial direction of the shaft 12 by means of a screw feed action. With the advancement/retraction of the nut member 28, a tilting member such as the mount bracket 5 vertically tilts in the direction indicated by the arrow of double-dotted chain line of FIG. 1 around the horizontal line H with respect to a fixing member such as the lamp housing 3, and initial setting of an optical axis in the vertical direction of the headlamp 1 is performed.

After the initial setting of the optical axis in the vertical direction of the headlamp 1 has been completed, a light source of a lamp unit of the headlamp 1 is lit. The light from the light source is then illuminated as a predetermined light distribution pattern to a forward direction of a vehicle through a lamp lens 4 along a predetermined optical axis.

When a posture of the vehicle changes, a control unit of an auto leveling system detects the change of the posture of the vehicle, and drives a motor 11. The motor 11 may be driven by means of a manual switch. When the motor 11 is driven, a drive force of the motor 11, i.e., a rotational force of an output axis of the motor 11 is transmitted to the shaft 12 via the drive force transmission mechanism. By means of the action of the drive force transmission mechanism, the shaft 12 is then merely advanced/retracted without rotating with respect to the housings 9, 10 and the cylinder portion 15.

Thus, when the shaft 12 is advanced/retracted by driving the motor 11 in the direction indicated by the arrow drawn by the solid line, of FIG. 1, (in the axial direction of the shaft 12) with respect to the housings 9, 10 and the cylinder portion 15, the nut member 28 is advanced/retracted in the direction indicated by the arrow drawn by the dashed line, of FIG. 1, integrally with the advancement or retraction of the shaft 12. In this manner, the tilting member such as the mount bracket 5 vertically tilts in the direction indicated by the arrow drawn by the double-dotted chain line, of FIG. 1, around the horizontal line H with respect to the fixing member such as the lamp housing 3, and the optical axis of the headlamp 1 is automatically adjusted in response to the change of the posture of the vehicle.

The vehicle headlamp having the leveling device, of the embodiment, i.e., the headlamp 1 is made of the abovementioned constituent elements and functions, and hereinafter, advantageous effect of the vehicle headlamp will be described.

Figure 4:
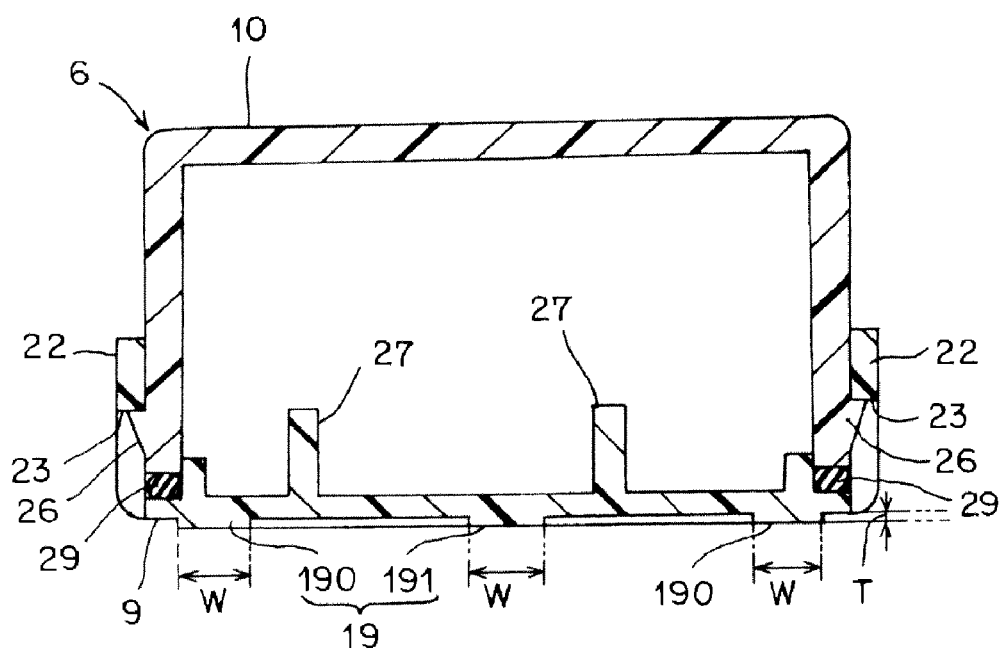
FIG. 4 is a cross section taken along the line IV-IV of FIG. 3.
Figure 5:
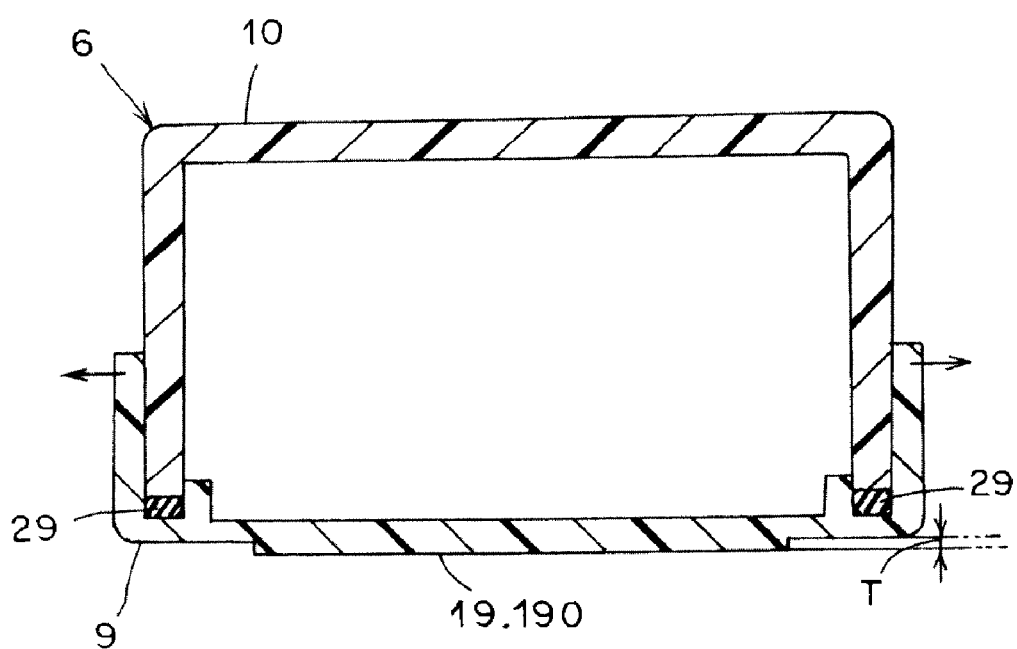
FIG. 5 is a cross section taken along the line V-V of FIG. 3.

The vehicle headlamp having the leveling device, of the embodiment, i.e., the headlamp 1, is provided in such a manner that: the cylinder portion 15 of the housings 9, 10 of the leveling device 6 is mounted at a rim of the circular through hole 55 of the mount portion 53 of the lamp housing 3; the leveling device 6 is mounted on the mount portion 53 of the lamp housing 3; and further, the abutment protrusive portion 18 of the mount portion 53 of the lamp housing 3 is allowed to abut against the abutment face protrusive portions 19, 190, 191 of an inter-wheel side housing 9 of the leveling device 6, allowing the lamp housing 3 and the leveling device 6 to be mounted in a stable manner without a backlash. The vehicle headlamp having the leveling device, of the embodiment, i.e., the headlamp 1, is provided in such a manner that: the abutment face protrusive portions 19, 190, 191 are provided partly of the foreside housing 9, thus allowing the thickness of the foreside housing 9 to be increased at sites of the abutment face protrusive portions 19, 190, 191 and decreased at other sites, as shown in FIGS. 4 and 5. Therefore, the vehicle headlamp having the leveling device, of the embodiment, i.e., the headlamp 1, becomes capable of precluding a surface sink from occurring with an exterior face of the foreside housing 9 corresponding to the protrusive portion or rib 27, even in a case where a protrusive portion or a rib 27 exists inside of the foreside housing 9, and becomes capable of precluding deformation of the exterior face of the foreside housing 9. As a result, the vehicle headlamp having the leveling device, of the embodiment, i.e., the headlamp 1, becomes capable of ensuring a stable distance between the mount portion 53 of the lamp housing 3 and the foreside housing 9 of the leveling device 6, thus enabling the lamp housing 3 and the leveling device 6 to be mounted in a stable manner without a backlash.

In addition, the vehicle headlamp having the leveling device, of the embodiment, i.e., the headlamp 1, is provided in such a manner that: the abutment face protrusive portions 19, 190 each have a predetermined width W and height T and are provided along a rim (outer circumference) of the foreside housing 9, so that the strength of the rim of the foreside housing 9 is improved, making it possible to preclude the foreside housing 9 from warping due to a change of an ambient temperature and to maintain performance of the leveling device 6, as the result of the improvement. For example, as shown in FIGS. 4 and 5, there may be a case in which: a housing is divided into two sections, the foreside housing 9 as a first portion at which the cylinder portion 15 and the abutment face protrusive portions 19, 190, 191 are provided and the other one, the backside housing 10 of a second portion; the foreside housing 9 and the backside housing 10 are integrally fixed to each other by means of engagement between the rim of the engagement hole 23 and the engagement claw 26 in a state in which the foreside housing 9 is engaged with the backside housing 10 from the outside; and a sealing member 29 such as packing is interposed between the foreside housing 9 and the backside housing 10. In this case, the strength of the rim of the foreside housing 9 is improved by means of the abutment face protrusive portions 19, 190 that are provided along the rim of the foreside housing 9, so that the foreside housing 9 warps due to a change of an ambient temperature, making it possible to preclude a side wall of the foreside housing 9 from opening in the direction indicated by the arrow drawn by the solid line, of FIG. 5. In this manner, a state of engagement between the rim of the engagement hole 23 and the engagement claw 26 is stabilized, making it possible to preclude disengagement of the engagement claw 26 from the rim of the engagement hole 23. In addition, a crush quantity of the sealing member 29 between the foreside housing 9 and the backside housing 10 is stabilized, making it possible to preclude entry of water or dust into the housing. As a result, performance of the leveling device 6 can be maintained with respect to a change of an ambient temperature.

Moreover, the vehicle headlamp having the leveling device, of the embodiment, i.e., the headlamp 1, is provided in such a manner that: the abutment face protrusive portions 19, 190 each have a predetermined width W, and are provided along a rim (outer circumference) of the foreside housing 9, so that the abutment protrusive portion 18 abutting against the abutment face protrusive portions 19, 190 can be provided in a range corresponding to the abutment face protrusive portions 19, 190, i.e., at any position (site) in a wide range along the rim of the foreside housing 9, of the mount portion 53 of the lamp housing 3. As a result, the vehicle headlamp having the leveling device, of the embodiment, the headlamp 1, is provided in such a manner that: the shape or layout of the mount portion 53 of the lamp housing 3 is different depending upon vehicle types; and even in a case where the abutment protrusive portion 18 is provided at a position different from the mount portion 53 of the lamp housing 3, the abutment face protrusive portions 19, 190, a respective one of which has a predetermined width W and is provided along the rim (outer circumference) of the foreside housing 9, can suffice. In this manner, the headlamp 1 allows the shared leveling device 6 of one type to be compatible with the lamp housing 3 of the headlamp 1 of various vehicle types, so that manufacture or product management of the leveling device 6 is simplified and cost reduction can be achieved accordingly.

Further, the vehicle headlamp having the leveling device, of the embodiment, i.e., the headlamp 1, is provided in such a manner that: the shaft 12 is positioned on the vertical centerline VO-VO of the housings 9, 10; and the abutment face protrusive portions 19, 191 each have a predetermined width W and height T, and is provided on the vertical centerline VO-VO of the housings 9, 10, so that: a center of a mount site between the rim of the circular through hole 55 of the mount portion 53 of the lamp housing 3 and the cylinder portion 15 of the housings 9, 10 of the leveling device 6; and an abutment site between the abutment protrusive portion 18 of the mount portion 53 of the lamp housing 3 and the abutment face protrusive portions 19, 191 of the foreside housing 9 of the leveling device 6, are positioned on the vertical centerline VO-VO of the housings 9, 10. Therefore, the vehicle headlamp having the leveling device, of the present invention, i.e., the headlamp 1, allows the leveling device 6 to be fixed to the lamp housing 3 in a well-balanced manner on the left and right with respect to the vertical centerline VO-VO of the housings 9, 10, so that the lamp housing 3 and the leveling device 6 can be mounted in a stable manner without a backlash.

Moreover, the vehicle headlamp having the leveling device, of the embodiment, i.e., the headlamp 1, is provided in such a manner that: the abutment face protrusive portions 19, 191 each have a predetermined width W, and are provided on the vertical centerlines VO-VO of the foreside housing 9, so that the abutment protrusive portion 18 abutting against the abutment face protrusive portions 19, 191 can be provided in a range corresponding to the abutment face protrusive portions 19, 191, i.e., at any position (site) in a wide range on the vertical centerline VO-VO of the foreside housing 9, of the mount portion 53 of the lamp housing 3. As a result, the vehicle headlamp having the leveling device, of the embodiment, the headlamp 1, is provided in such a manner that the shape or layout of the mount portion 53 of the lamp housing 3 is different depending upon vehicle types; and even in a case where the abutment protrusive portion 18 is provided at a position different from the mount portion 53 of the lamp housing 3, the abutment face protrusive portions 19, 191, a respective one of which has a predetermined width W and is provided on the vertical centerlines VO-VO the foreside housing 9, can suffice. In this manner, the vehicle headlamp having the leveling device, of the embodiment, i.e., the headlamp 1 allows the shared leveling device 6 of one type to be compatible with the lamp housing 3 of the headlamp 1 of various vehicle types, so that manufacture or product management of the leveling device 6 is simplified and cost reduction can be achieved accordingly.

The foregoing embodiment described a headlamp 1 as a vehicle headlamp having a leveling device 6. However, the present invention is applicable to a vehicle headlamp having the leveling device 6 other than the headlamp 1.

In addition, in the above-described embodiment, the abutment face protrusive portions 19, 190, 191 each having a predetermined width W and height T were provided along the rim of the foreside housing 9 and were provided on the vertical centerline VO-VO of the foreside housing 9. However, in the present invention, an abutment face protrusive portion may be provided along the rim of the foreside housing 9, may be provided on the vertical centerline VO-VO of the foreside housing 9, or alternatively, may be provided partly of the foreside housing 9.

Further, in the foregoing embodiment, the abutment face protrusive portions 19, 190, 191 each having a predetermined width W and height T were provided along the rim of the foreside housing 9 and were provided on the vertical centerline VO-VO of the foreside housing 9. However, in the present invention, an abutment face protrusive portion may be provided at any position of the foreside housing 9. It is preferable that the abutment face protrusive portion be provided in the range indicated by the double-dotted chain line of FIG. 3.

What is claimed is:

1. A vehicle headlamp having a leveling device for adjusting an optical axis, said vehicle headlamp comprising:
   a fixing member;
   a tilting member which is tiltably mounted on the fixing member; and
   the leveling device, wherein:
   the fixing member has:
      a mount portion in which a through hole is provided; and
      an abutment protrusive portion which is provided on the mount portion; and wherein:
   the leveling device has:
      a housing for providing a cylinder portion which is inserted into a through hole and is mounted at a rim of the through hole;
      a drive unit which is disposed in the housing;
      a shaft which is retractably mounted on the housing and cylinder portion, is mounted on the tilting member, is advanced/retracted with respect to the housing and the cylinder portion by driving the drive unit, for tilting the tilting member with respect to the fixing member to adjust an optical axis of the vehicle headlamp; and
      an abutment face protrusive portion which is provided partly of the housing and allows the abutment protrusive portion to be in abutment against.

2. The vehicle headlamp according to claim 1, wherein:
   the abutment face protrusive portion has a predetermined width and height, and is provided along a rim of the housing.

3. The vehicle headlamp according to claim 1, wherein:
   the shaft is positioned on a vertical centerline of the housing, and the abutment face protrusive portion has a predetermined width and height, and is provided on the vertical centerline of the housing.

4. A vehicle headlamp, comprising:
   (i) a lamp housing forming a lamp room together with a lamp lens and having an insert hole;
   (ii) a mount bracket which is mounted on the lamp housing so as to be tiltable in the lamp room, for mounting a lamp unit for illuminating a predetermined light distribution pattern to a forward direction of a vehicle through the lamp lens; and
   (iii) a leveling device including:
      a cylinder portion which is mounted at a rim of the insert hole of the lamp housing; and
      a shaft which is retractably mounted on the cylinder portion and is inserted into the insert hole of the lamp housing, for tilting the mount bracket to adjust an optical axis of the lamp unit, wherein:
   the vehicle headlamp includes an abutment portion which is downward of a face having the shaft and the cylinder portion, of the leveling device, provided thereon, and is disposed between the leveling device and an exterior wall of the lamp housing, and which is formed so that the leveling device and the exterior wall of the lamp housing are in abutment against each other while maintaining a predetermined distance.

5. The vehicle headlamp according to claim 4, wherein:
   the abutment portion has an abutment face protrusive portion which is formed downward of a face having the shaft and the cylinder portion, of the leveling device, provided thereon, the abutment face protrusive portion having a predetermined thickness toward the exterior wall of the lamp housing.

6. The vehicle headlamp according to claim 4, wherein:
   the abutment portion has: an abutment face protrusive portion which is formed downward of a face having the shaft and the cylinder portion, of the leveling device, provided thereon, the abutment face protrusive portion having a predetermined thickness toward the exterior wall of the lamp housing; and an abutment protrusive portion which is formed on the exterior wall of the lamp housing, for abutting against the abutment face protrusive portion of the leveling device.

7. The vehicle headlamp according to claim 4, wherein:
   the abutment portion has an abutment protrusive portion which is formed on the exterior wall of the lamp housing, for abutting against the leveling device.

8. The vehicle headlamp according to claim 4, wherein:
   the abutment portion has an abutment face protrusive portion which is formed downward of the face having the shaft and the cylinder portion, of the leveling device, provided thereon, so as to preclude a downward deformation of the face having the shaft and the cylinder portion, of the leveling device, provided thereon, the abutment face protrusive portion having a predetermined thickness toward the exterior wall of the lamp housing.

9. A vehicle headlamp, comprising:
   (i) a lamp housing forming a lamp room together with a lamp lens and having an insert hole;
   (ii) a mount bracket which is mounted on the lamp housing so as to be tiltable in the lamp room, for mounting a lamp unit for illuminating a predetermined light distribution pattern to a forward direction of a vehicle through the lamp lens; and
   (iii) a leveling device including:
      a cylinder portion which is mounted at a rim of the insert hole of the lamp housing; and
      a shaft which is retractably mounted on the cylinder portion and is inserted into the insert hole of the lamp housing, for tilting the mount bracket to adjust an optical axis of the lamp unit, wherein:
   the leveling device includes an abutment face protrusive portion which is formed downward of a face having the shaft and the cylinder portion, of the leveling device, provided thereon, the abutment face protrusive portion having a predetermined thickness toward an exterior wall of the lamp housing so that the leveling device and the exterior wall of the lamp housing are in abutment against each other while maintaining a predetermined distance.

10. The vehicle headlamp according to claim 9, wherein:
    the lamp housing includes an abutment protrusive portion which is formed at a position opposite to the abutment face protrusive portion of the leveling device on the exterior wall of the lamp housing, for abutting against the leveling device.

* * * * *